United States Patent [19]

Koros et al.

[11] Patent Number: 5,288,304
[45] Date of Patent: Feb. 22, 1994

[54] COMPOSITE CARBON FLUID SEPARATION MEMBRANES

[75] Inventors: William J. Koros; Cheryl W. Jones, both of Austin, Tex.

[73] Assignee: The University of Texas System, Austin, Tex.

[21] Appl. No.: 52,423

[22] Filed: Mar. 30, 1993

[51] Int. Cl.$^5$ .............................................. B01D 53/22
[52] U.S. Cl. ........................................ 95/45; 95/54; 96/10; 96/13
[58] Field of Search ............................ 55/16, 158, 524

[56] References Cited

U.S. PATENT DOCUMENTS

| Re. 33,273 | 7/1990 | Speaker | 210/639 |
|---|---|---|---|
| 3,616,607 | 11/1971 | Klass et al. | 55/16 |
| 3,775,303 | 11/1973 | McKinney et al. | 208/210 |
| 4,230,463 | 10/1980 | Henis et al. | 55/16 |
| 4,685,940 | 8/1987 | Soffer et al. | 55/158 |
| 4,728,345 | 3/1988 | Murphy | 55/158 |
| 4,754,009 | 6/1988 | Squire | 526/247 |
| 4,767,422 | 8/1988 | Bikson et al. | 55/16 |
| 4,897,457 | 1/1990 | Nakamura et al. | 526/247 |
| 4,935,477 | 6/1990 | Squire | 526/247 |
| 5,067,971 | 11/1991 | Bikson et al. | 55/16 |

FOREIGN PATENT DOCUMENTS

| 0337499 | 10/1989 | European Pat. Off. |
| 63-264101 | 11/1988 | Japan |
| 4198918 | 7/1990 | Japan |
| 2207666A | 2/1989 | United Kingdom |

Primary Examiner—Robert Spitzer
Attorney, Agent, or Firm—Cary A. Levitt

[57] ABSTRACT

The invention provides carbon membranes for use in fluid separation processes, particularly gas separations, which are treated with a coating that provides a protective barrier which significantly limits permeation of water vapor or other impurities such as hydrocarbons without significantly inhibiting permeation of the faster fluid component or lowering selectivity. The composite membranes retain good fluid separation properties and are resistant to the adverse effects on membrane performance commonly observed in environments having high humidity. The coating is preferably an amorphous polymer of perfluoro-2,2-dimethyl-1,3-dioxole. The membranes can be of a varied configuration: sheet form, hollow fiber, asymmetrical membranes and the like.

21 Claims, 2 Drawing Sheets

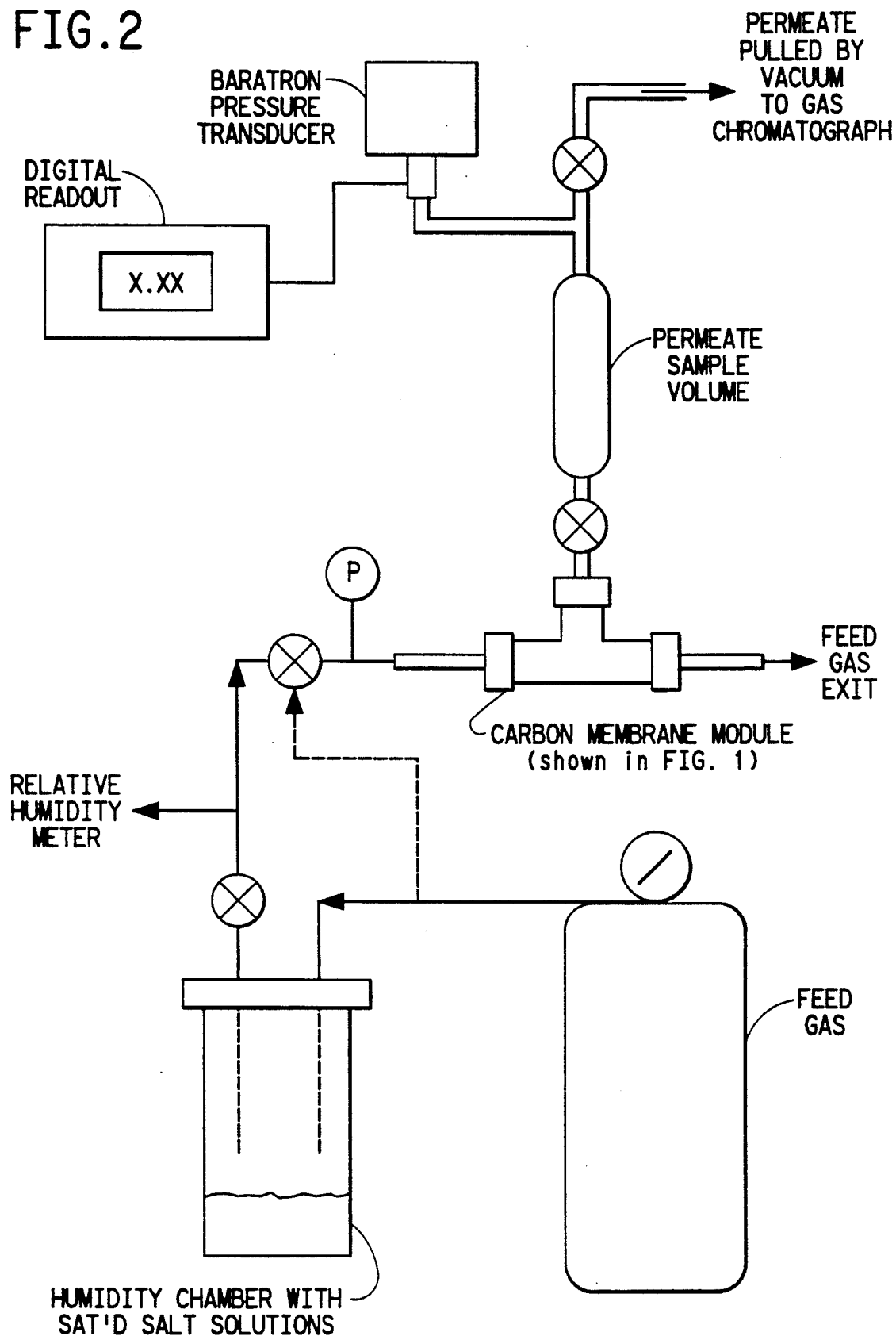

COMPOSITE CARBON FLUID SEPARATION MEMBRANES

FIELD OF THE INVENTION

The invention relates to novel carbon fluid separation membranes and a process for the separation of fluids, particularly gases. In particular, the invention provides composite membranes for use in fluid separations, which are treated with a coating that provides a protective barrier which significantly reduces the adverse effects on the performance of the membrane caused by high humidity or other impurities in the fluid to be treated.

BACKGROUND OF THE INVENTION

The use of membranes for separation processes is well known. Certain carbon membranes are particularly useful for the separation of fluids, especially gases such as oxygen and nitrogen.

The membranes may be fabricated in various geometrical configurations, such as sheet formed membranes and hollow fibers. The membranes may be symmetrical, asymmetrical, single-component or composite.

Carbon membranes have superior selectivities and productivities for many separations. However, a major problem with these membranes has been their vulnerability to the effects of water vapor and other condensible agents and impurities such as oils or other hydrocarbon compounds. For example, humidity levels well below 100% relative humidity are sufficient to significantly impair the performance of the carbon membrane. Small amounts of oil or other hydrocarbons can also significantly impair the performance of the membrane.

In order to reduce the humidity of the fluid to be permeated, the fluid may be treated with dehumidifying agents. This typically involves the use of large, expensive equipment. Such equipment is also prone to failure. In addition, other condensible agents and impurities may be removed from the fluid to be permeated by various filtration, separation or extraction techniques. These measures may also involve the use of large, expensive equipment and are often not successful.

It is known to prepare composite membranes and/or post treat membranes with materials that seal or heal defects or improve the stability of the membrane. For example, U.S. Pat. Nos. 3,616,607 and 3,775,303 exemplify gas separation membranes having superimposed membranes on a porous support.

U.S. Pat. No. 4,230,463 deals broadly with the post treatment of fluid separation membranes. It describes a wide variety of membranes for liquid and gas separations, particularly a multicomponent membrane where the separation properties of the membrane are principally determined by the porous separation membrane as opposed to the material of the coating. The coating cures defects in the surface of the membrane. U.S. Pat. No. 4,767,422 also discloses a method of posttreating composite membranes to cure defects in the thin separation layer. U.S. Pat. No. 4,728,345 describes a multicomponent membrane for gas separation having a polyphosphazene coating in occluding contact with a porous separation membrane for the purpose of improving stability of the membrane when exposed to aromatic and aliphatic hydrocarbons contained in a gaseous mixture.

EPO Patent Application 0,337,499 discloses a gas separation membrane with a covering layer formed from a selective film. The covering layer is made from a polymer having a critical surface tension not larger than 30 dynes/cm, such as poly-4-methylpentene-1, fluorinated alkyl methacrylate and polymethyl fluorinated alkyl siloxane.

U.S. Pat. No. Re. 33,273 describes a method of improving the characteristics of separatory membranes by the deposition of a fluorinated amphiphilic compound in an oriented layer on the surface of the membrane so as to increase membrane selectivity and counteract membrane surface properties leading to fouling caused by colloidal materials.

The prior art references do not, however, teach a polymeric membrane treatment for reducing the adverse effects of impurities on the performance of carbon membranes. A carbon membrane is, therefore, needed with good permeation properties and significant resistance to the effects of water vapor and other condensible agents and impurities. The inventive fluid separation membrane is a composite carbon membrane which retains high selectivities for fluid separations and is significantly more resistant to the adverse affects commonly observed in environments having high humidity or other impurities.

SUMMARY OF THE INVENTION

This invention relates to novel fluid separation membranes and a process for the separation of fluids. A carbon membrane is coated with a thin layer of polymeric material that offers resistance to water vapor permeation. Preferably, the coating does not significantly inhibit permeation of the fluids to be separated, does not significantly lower the membrane's selectivity, is chemically resistant to the fluids to be separated and does not decompose at high temperatures. Suitable coatings include hydrocarbon polymers such as poly(4-methyl-1-pentene), polymers having an aliphatic ring structure containing fluorine, preferably amorphous polymers of perfluoro-2,2-dimethyl-1,3-dioxole and silicone-containing polymers such as polysiloxanes and poly(1-trimethylsilyl) propyne. The resulting carbon membranes retain high selectivities for fluid separations and are also significantly more resistant to the adverse affects observed in environments having high humidity or having other condensible agents or impurities such as oil or other hydrocarbons. These composite membranes are widely useful in producing nitrogen enriched air for applications such as nitrogen blanketing for food, pharmaceutical uses and fuel storage applications. These composite membranes are also effective in the separation of other gases including carbon dioxide/methane, hydrogen/nitrogen and hydrogen/methane.

BRIEF DESCRIPTION OF THE DRAWINGS

FIG. 2 is a schematic drawing which shows a diagram of the membrane test system.

DETAILED DESCRIPTION OF THE INVENTION

Figure 1A:
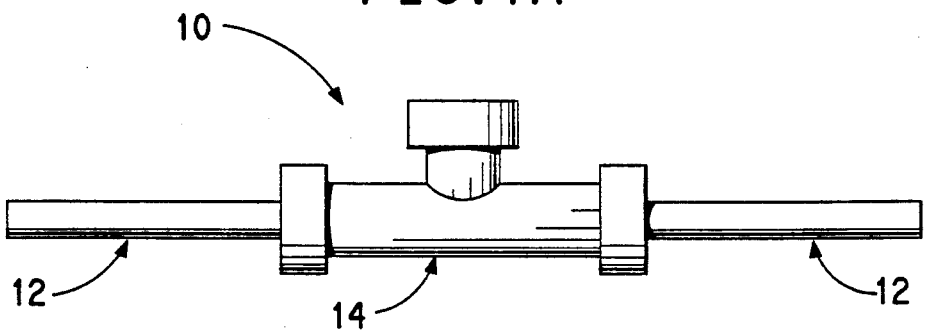
FIGS. 1A, 1B and 1C are schematic drawings which show the test module used to characterize the properties of the carbon membranes.

Fluid separation membranes are well known in the art. Preferably, the membranes have pores of a predetermined narrow range of size. The size can be varied at will within certain limits, and for the separation of gaseous mixtures membranes advantageously have a pore size of definite value, which can be varied in membranes for various purposes from about 2.5 Angstrom to about 10 Angstrom, preferably 3 to 5 Angstrom.

Membranes of flat configuration (in sheet form) are generally of a thickness of from about 1 $\mu$m to about 50 $\mu$m, although for different purposes different thicknesses can be used. With asymmetrical flat membranes the thickness of the effective separating layer of the membrane can be even thinner than 1 $\mu$m. When the membrane is used in the form of hollow fibers, the diameter will generally vary between 5 $\mu$m and 1 mm, preferably 50 to 1000 $\mu$m with a wall thickness of from about 1 $\mu$m to about 300 $\mu$m, preferably about 10 $\mu$m–100 $\mu$m according to the diameter.

For purposes of this invention, the fluid separation membranes are carbon membranes.

U.S. Pat. No. 4,685,940 teaches carbon membranes for use in separation processes. Carbon membranes have a predetermined pore size and function as molecular sieves. Carbon membranes function well even at elevated temperatures. Carbon membranes used in the present invention are produced by the controlled pyrolysis of a suitable polymeric material under conditions which retain the basic integrity of the original geometry. Suitable materials include polyimides, polyamides, cellulose and derivatives thereof, thermosetting polymers, acrylics, pitch-tar mesophase, and the like. These materials are not limiting, as other materials may be useful for fabricating carbon membranes. Selection of the polymeric material for the carbon membrane for fluid separations may be made on the basis of the heat resistance, solvent resistance, and mechanical strength of the porous separation membrane, as well as other factors dictated by the operating conditions for selective permeation.

The pyrolysis can be generally effected in a wide range of temperatures, between the decomposition temperature of the carbonaceous material and the graphitization temperature (about 3000° C.). Generally, pyrolysis will be effected in the range of from 250° C. to 2500° C., a preferred range being about 450° C. to about 800° C.

The carbon membranes contain pores larger than the ultramicropores required for the molecular seiving process. These larger pores connect the ultramicropores that perform the molecular sieving process and allow for high productivities in the dry membrane state. Generally, the higher the final temperature used for the pyrolysis of the polymer, the smaller are the pores of the product, and thus the smaller the molecules which could permeate through such membranes.

One of the primary advantages of carbon membranes is their ability to effect gaseous separations at high temperatures. The separation can be effected at any desired temperature, up to temperatures where carbon membranes begin to deteriorate. For nonoxidizing gases, this temperature may be as high as about 1000° C.

The pyrolysis of suitable precursors, generally under conditions conventionally used for the production of carbon fibers, results in a product which has a certain microporosity of molecular dimensions which is responsible for the molecular sieve properties of the carbons.

During the pyrolysis process, the heating is preferably effected under an inert atmosphere such as nitrogen or noble gas which aids in controlling oxidation. Controlled oxidation results in a pore opening, and thus predetermined pore-size ranges can be obtained, suitable for the intended separation process. Suitable oxidizing agents include oxygen, steam, carbon dioxide, nitrogen oxides and chlorine oxides, solutions of nitric acid, sulfuric acid, chromic acid and peroxide solutions. After oxidation treatment the membrane should be degassed at elevated temperatures. Asymmetrical membranes can be prepared by the controlled pyrolysis of conventional asymmetrical organic membranes having the required structure. Such membranes can also be produced by the deposition of a thin permselective carbon layer on a porous support by methods known in the art.

For the intended use, it is advantageous to obtain fluid separation membranes having pore size and a pore size distribution that effectively separate specific mixtures of fluids. Generally, a pore size of 3–10 Angstrom is suitable and 3–5 Angstroms is preferable for gas separations.

By depositing a layer or coating of certain protective or barrier materials on surface of the polymer or carbon separation membrane, the adverse effects of humidity or other impurities on the performance of the membranes may be minimized. Suitable materials must offer some resistance to the permeability of water vapor or other condensible agents or impurities while not prohibitively inhibiting the permeability of the fluids to be separated. Preferably, the protective or barrier coating is easily solubilized so that it may be coated on the surface of the membrane. In addition, the protective or barrier coating is preferably chemically inert and resistant to decomposition at elevated temperatures.

Suitable coatings include polymers having an aliphatic ring structure containing fluorine, for example an amorphous polymer of perfluoro-2,2-dimethyl-1,3-dioxole. In embodiments, the polymer is a homopolymer of perfluoro-2,2-dimethyl-1,3-dioxole. In other embodiments, the polymer is a copolymer of perfluoro-2,2-dimethyl-1,3-dioxole, including copolymers having a complementary amount of at least one monomer selected from the group consisting of tetrafluoroethylene, perfluoromethyl vinyl ether, vinylidene fluoride and chlorotrifluoroethylene. In preferred embodiments, the polymer is a dipolymer of perfluoro-2,2-dimethyl-1,3-dioxole and a complementary amount of tetrafluoroethylene, especially such a polymer containing 65–99 mole % of perfluoro-2,2-dimethyl-1,3-dioxole. The amorphous polymer preferably has a glass transition temperature of at least 140° C., and more preferably at least 180° C. Glass transition temperature ($T_g$) is known in the art and is the temperature at which the polymer changes from a brittle, vitreous or glassy state to a rubbery or plastic state. Examples of dipolymers are described in further detail in U.S. Pat. No. 4,754,009 and U.S. Pat. No. 4,935,477, both of E. N. Squire. The polymer may, for example, be an amorphous copolymer of perfluoro(2,2-dimethyl-1,3-dioxole) with a complementary amount of at least one other comonomer, said copolymer being selected from the group consisting of dipolymers with perfluoro(butenyl vinyl ether) and terpolymers with perfluoro(butenyl vinyl ether) and with a third comonomer, wherein the third comonomer can be (a) a perhaloolefin in which halogen is fluorine or chlorine, or (b) a perfluoro(alkyl vinyl ether); the amount of the third comonomer, when present, preferably being at most 40 mole % of the total composition. Polymerization is performed by methods known in the art.

Other suitable polymers having an aliphatic ring structure containing fluorine are described in U.S. Pat. No. 4,897,457 of Nakamura et al. and Japanese Published Patent Application Kokai 4-198918 of Nakayama et al; e.g., a fluorine-containing thermoplastic resinous polymer consisting of a group of repeating units to be represented by the following general formula:

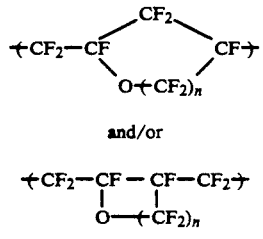

and/or $$+CF_2-CF-CF-CF_2+$$
$$\phantom{+CF_2-C}|\phantom{F-CF}|$$
$$\phantom{+CF_2-}O-(CF_2)_n$$

(where: n is an integer of 1 or 2); and copolymers thereof.

The glass transition temperature of the amorphous polymer will vary with the actual polymer of the membrane, especially the amount of tetrafluoroethylene or other comonomer that may be present. Examples of $T_g$ are shown in FIG. 1 of the aforementioned U.S. Pat. No. 4,754,009 of E.N. Squire as ranging from about 260° C. for dipolymers with tetrafluoroethylene having low amounts of tetrafluoroethylene comonomer down to less than 100° C. for the dipolymers containing at least 60 mole % of tetrafluoroethylene.

In preferred embodiments of the membranes and methods of the present invention, the polymer is a copolymer of perfluoro-2,2-dimethyl-1,3-dioxole, especially a copolymer having a complementary amount of at least one monomer selected from the group of tetrafluoroethylene, perfluoromethyl vinyl ether, vinylidene fluoride and chlorotrifluoroethylene.

In other embodiments, the polymer is a homopolymer of perfluoro-2,2-dimethyl-1,3-dioxole.

In further embodiment, the polymer is a dipolymer of perfluoro-2,2-dimethyl-1,3-dioxole and a complementary amount of tetrafluoroethylene.

Suitable coatings also include poly(4-methyl-1-pentene), and silicon-containing polymers such as polysiloxanes and poly(1-trimethyl silyl) propyne. The preferred coating is TEFLON ® AF (commerically available from E. I. du Pont de Nemours and Company) which is a dipolymer of perfluoro-2,2-dimethyl-1,3-dioxole and tetrafluoroethylene.

While any suitable method can be employed, the method by which the coating is applied can have some bearing on the overall performance of the composite membranes. The membranes according to the invention can be prepared for instance, by coating a membrane with a substance containing the material of the coating such that the coating has a resistance to fluid flow which is low in comparison to the total resistance of the multicomponent membrane. The coating may be applied in any suitable manner; e.g., by a coating operation such as spraying, brushing, immersion in an essentially liquid substance comprising the material of the coating or the like. The material of the coating is preferably contained in an essentially liquid substance when applied and may be in a dispersion or solution using a dispersion or solvent for the material of the coating which is substantially a nonsolvent for the material of the membrane. Advantageously, the substance containing the material of the coating is applied to one surface of the separation membrane, and the other side of the separation membrane is subjected to a lower absolute pressure. However, the invention itself is not limited by the particular method by which the material of the coating is applied.

Particularly advantageous materials for the coating have relatively high permeability constants for fluids such that the presence of a coating does not unduly reduce the permeation rate of the multicomponent membrane for desired components. The added resistance to fluid flow of the coating is preferably relatively small in comparison to the resistance of the membrane but high with respect to water or other condensible agents or impurities.

Based on estimates of the average pore diameter of the membrane, materials for the coating of appropriate molecular size can be chosen. If the molecular size of the material of the coating is too large to be accommodated by the pores of the membrane, the material may not be useful. If, on the other hand, the molecular size of the material for the coating is too small, it may be drawn through the pores of the membrane during coating and/or separation operations. Thus, with membranes having larger pores, it may be desirable to employ materials for coating having larger molecular sizes. When the pores are in a wide variety of sizes, it may be desirable to employ a polymerizable material for the coating material which is polymerized after application to the membrane, or to employ two or more coating materials of different molecular sizes; e.g., by applying the materials of the coating in order of their increasing molecular sizes.

Coated polymer membranes were evaluated for resistance to the effects of water in the fluids to be separated. Coated carbon membranes were evaluated at humidity levels ranging from 23% to 85% relative humidity. The performance of the membranes is characterized in terms of membrane productivity and selectivity. The Examples demonstrate a correlation between the level of relative humidity and the loss in membrane performance, with the most severe occurring at the highest relative humidity levels. At relatively low relative humidity levels, the coated carbon membranes retain the pre-exposure selectivity and a significant degree of the pre-exposure productivity. Thus, it is believed the coating ameliorates the humidity effects on the membranes. By depositing a layer of the coating on the membrane, it is believed that the thermodynamic activity of water at the surface of the membrane is reduced by reducing the flux of water relative to that of the fluid to be separated through the coating.

This advantageously enables coated membranes to be exposed to higher levels of relative humidity or other condensible agents or impurities while maintaining the performance levels seen at lower levels of relative humidity or other condensible agents or impurities levels.

The pressure normalized flux of gases through membranes can be defined as:

$$1 \text{ GPU} = \frac{10^{-6} \text{ cm}^3 \text{ (STP)}}{\text{cm}^2 \times \text{sec.} \times \text{cm Hg}}$$

wherein cm³ (STP)/sec is the flux (flow rate) in units volume per seconds of permeated gas at standard temperatures and pressure, cm² is the area of film, and cm Hg is the pressure (or driving force).

The selectivity of a membrane in separating a 50/50 mixture of a two-component fluid is defined as the ratio of the rate of passage of the more readily passed component to the rate of passage of the less readily passed component. Selectivity may be obtained directly by contacting a membrane with a known mixture of fluids and analyzing the permeate. Alternatively, a first approximation of the selectivity is obtained by calculating the ratio of the rates of passage of the two components determined separately on the same membrane under equivalent driving pressure differences. Rates of passage may be expressed in GPU units. As an example of selectivity, a $O_2/N_2 = 10$ indicates that the subject membrane allows oxygen gas to pass through at a rate 10 times that of nitrogen for a 50/50 feed mixture.

Relative Humidity is defined as the ratio of the partial pressure of the water vapor to the vapor pressure of the liquid at a given temperature.

The invention as described herein is useful for the separation of, for example, oxygen from nitrogen; hydrogen from at least one of carbon monoxide, carbon dioxide, helium, nitrogen, oxygen, argon, hydrogen sulfide, nitrous oxide, ammonia, and hydrocarbon of 1 to about 5 carbon atoms, especially methane, ethane and ethylene; ammonia from at least one of hydrogen, nitrogen, argon, and hydrocarbon of 1 to about 5 carbon atoms, e.g., methane; carbon dioxide from at least one of carbon monoxide and hydrocarbon of 1 to about 5 carbon atoms, e.g., methane; hydrogen sulfide from hydrocarbon of 1 to about 5 carbon atoms, for instance, methane, ethane, or ethylene; and carbon monoxide from at least one of hydrogen, helium, nitrogen, and hydrocarbon of 1 to about 5 carbon atoms. It is emphasized that the invention is also useful for liquid separations and is not restricted to these particular separation applications or gases nor the specific multicomponent membranes in the examples.

EXAMPLES

The invention will now be further illustrated by way of the following Examples, which are considered to be illustrative only, and nonlimiting. The coatings and types of membranes examined are described in the Glossary. The process for formation, coating and testing of the membranes is described below:

A. Formation of Carbon Membranes

The carbon membranes were produced by pyrolyzing hollow fiber polymeric materials in a tube furnace as follows:

Individual fibers (8–10 inches long) are placed on piece of stainless steel mesh (about 1.5-2"×12") and held in place by wrapping a length of bus wire around the mesh and fibers. The mesh support and fibers are then placed in a quartz tube of 2" diameter which sits in a 24" Thermocraft tube furnace. The tube is centered so that the entire fiber length is within the effective heating zone. A pinch of polysulfone (about 0.04 gm) is spread along a 4" strip of aluminum foil and placed beneath the mesh support. The system is evacuated until the pressure is 0.15 mmHg or lower as determined by a mercury manometer. At this point liquid nitrogen is added to a cold trap to prevent back diffusion of oil vapors from the vacuum pump, and then the heating cycle is initiated.

Two different heating protocols are used depending on whether a tighter or more open pore network is desired. The tighter pore network is produced with the higher temperature (550° C.) protocol. The temperature is controlled by an Omega temperature controller. The two heating profiles are as follows:

| 500° C. protocol | 550° C. protocol |
|---|---|
| $SP_0$ - 50° C. | $SP_0$ - 50° C. |
| $T_1$ - 0:15 | $T_1$ - 0:15 |
| $SP_1$ - 250° C. | $SP_1$ - 250° C. |
| $T_2$ - 1:00 | $T_2$ - 1:14 |
| $SP_2$ - 485° C. | $SP_2$ - 535° C. |
| $T_3$ - 1:00 | $T_3$ - 1:00 |
| $SP_3$ - 500° C. | $SP_3$ - 550° C. |
| $T_4$ - 2:00 | $T_4$ - 2:00 |
| $SP_4$ - 500° C. | $SP_4$ - 550° C. |

SP = set point
T = time (hrs:min)

After the heating cycle is complete, the system is allowed to cool under vacuum. The carbon membranes are not removed from the furnace until the system temperature drops below 40° C.

B. Single Fiber Module Construction.

Figure 1B:
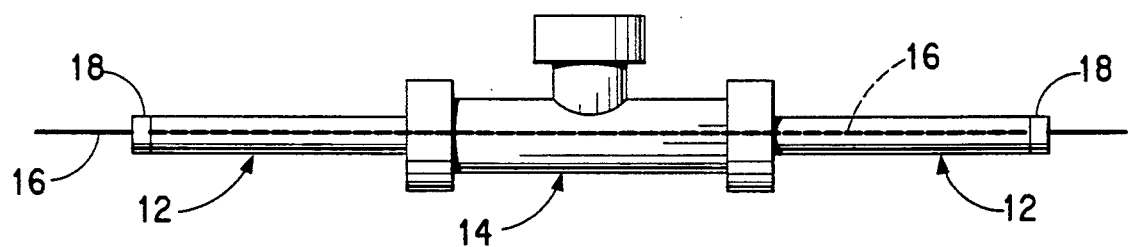
Figure 1C:
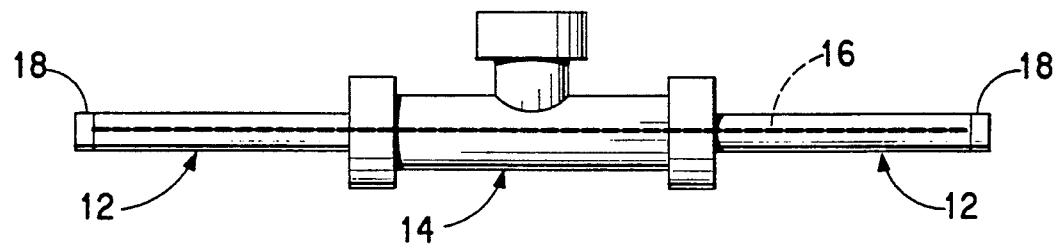

The characterization work was performed with single fiber test modules shown in FIG. 1. The module is constructed from ¼" stainless steel tubing 12 and Swagelok ¼" tees 14. A small length of tubing 12 is attached to each arm of the tee 14 to form a housing as shown in FIG. 1A. The test module housing 10 has tubing 12 which has its ends plugged with epoxy 18. The hollow fiber carbon membrane 16 is threaded through the housing 10 so that a length of carbon fiber extends on each end. Five minute epoxy is used to plug the ends of the tubing 18, as shown in FIG. 1B and the ends of the carbon membrane are snapped off after the epoxy hardens as shown in FIG. 1C.

C. Coating the Membrane

The coating process takes place after the carbon membrane has been mounted in a module. Coating solutions were made by dissolving the appropriate polymeric material in the appropriate solvent so that the polymer concentration is generally in the 0.5 to 1.5% range. Because bore side feed method of operation was used our test system, the coating was applied to the bore side of the hollow fiber membrane. The solution was introduced at one end of the hollow fiber membrane, where it flowed down the length of the fiber and out the other end. A helium pressure head was used to force the flow and while the amount of coating solution fed through varied, it was generally in the range of 0.5 to 1.0 cc. During this process, vacuum was being pulled on the shell side of the membrane. This procedure provided enough coating solution on the membrane wall to make a layer in the 0.5–5.0 $\mu$m thickness range when the solvent evaporated. Dry air was fed through the bore until solvent removal is complete.

D. Membrane Test System

A diagram of the membrane test system is shown in FIG. 2. The membrane module was attached in a bore feed method of operation and feed was supplied from compressed gas cylinders. The feed gas could either be used dry or passed through a humidity chamber prior to the membrane module. The humidity chamber consisted of a stainless steel cannister in which different saturated salt solutions were used to control the relative humidity level. The relative humidity was also independently verified with an RH meter at an exit port.

Permeate from the shell side of the hollow fiber membrane was pulled by vacuum first through a sample volume and then through a gas chromatograph ("GC") sample loop. The sample volume was connected to a Baratron pressure transducer and total flux measurements were made by closing the valve to vacuum and measuring the pressure increase with time. Composition of the permeate was determined by GC and then the flux of each individual species was calculated.

E. Glossary

Coating A means TEFLON ® AF 1600 (commercially available from E. I. du Pont de Nemours and Company) which is a copolymer of perfluoro-2,2-dimethyl-1,3-dioxole and tetrafluoroethylene having a $T_g$ of about 160° C.

Coating B means TEFLON ® AF 2400 (commercially available from E. I. du Pont de Nemours and Company which is a copolymer of perfluoro-2,2-dimethyl-1,3-dioxole and tetrafluoroethylene having a $T_g$ of about 240° C.

Carbon membrane (1) means a membrane fabricated from a polyimide which is derived from a reaction of 2,4,6-trimethyl-1,3-phenylene diamine, 5,5-[2,2,2-trifluoro-1-(trifluoromethyl)ethylidene]-1,3-isobenzofurandion and 3,3',4,4'-biphenyl tetra carboyxlic acid dianhydride, pyrolyzed according to the 500° pyrolysis procedure described above. The membrane is commercially available from E. I. du Pont de Nemours and Company. Carbon membrane (2) means a membrane described above pyrolyzed according to the 550° pryolysis procedure described above.

Tables 1 and 2 compare the performance of coated and uncoated carbon membranes, respectively, which are exposed to humidity for 18-52 hours. After exposure to 62-65% Relative Humidity, the coated membranes have a negligible change in $O_2/N_2$ selectivity and a moderate loss in productivity. After exposure to 44-70% Relative Humidity, the uncoated membranes have a negligible change in $O_2/N_2$ selectivity with a more significant loss in productivity.

Tables 3 and 4 compare the performance of coated and uncoated carbon membranes, respectively, which are exposed to 83-85% Relative Humidity for 24 hours. The coated membranes have a negligible change or an increase in $O_2/N_2$ selectivity with a small to moderate loss in productivity. The uncoated membranes exhibit a much greater loss in productivity.

Table 5 compares the performance of coated and uncoated carbon membranes which are exposed to 83-85% Relative Humidity for 22-24 hours. The coated membrane shows a slight loss in $H_2/CH_4$ selectivity with a small loss in productivity. The uncoated membrane exhibits a very large loss in selectivity and a very large loss in productivity.

TABLE 1

Composite Membrane Performance at 62-65% Relative Humidity

| Exam. | Membrane Composition | Relative Humidity Exposure | Pre-exposure $O_2$ flux (GPU) | Post-exposure $O_2$ Flux (GPU) | Percentage Change in Flux After Exposure | Pre-exposure $O_2/N_2$ Selectivity | Post-exposure $O_2/N_2$ Selectivity | Percentage Change in Selectivity after Exposure |
|---|---|---|---|---|---|---|---|---|
| 1 | Carbon membrane (1) coated with 0.45 µm poly(4-methyl-1-pentene) | 62-65% for 18 hours | 23.9 | 13.6 | −43% | 7.3 | 7.4 | +1% |
| 2 | Carbon membrane (1) coated with 0.9 µm coating A | 62-65% for 24 hours | 34.5 | 21.4 | −38% | 9.6 | 9.8 | +2% |
| 3 | Carbon membrane (1) coated with 4 µm coating B | 62-65% for 52 hours | 33.5 | 26.8 | −20% | 8.3 | 8.8 | +6% |

TABLE 2

Uncoated Membrane Performance

| Comp Exam. | Membrane Composition | Relative Humidity Exposure | Pre-exposure $O_2$ flux (GPU) | Post-exposure $O_2$ Flux (GPU) | Percentage Change in Flux After Exposure | Pre-exposure $O_2/N_2$ Selectivity | Post-exposure $O_2/N_2$ Selectivity | Percentage Change in Selectivity after Exposure |
|---|---|---|---|---|---|---|---|---|
| 4 | Carbon membrane (1) with no coating | 44% for 19 hours | 25.2 | 12.9 | −49% | 9.6 | 9.6 | 0% |
| 5 | Carbon membrane (1) with no coating | 67-70% for 17 hours | 25.5 | 11.2 | −56% | 9.3 | 8.9 | −4.3% |

TABLE 3

Composite Membrane Performance at 83-85% Relative Humidity

| Exam. | Membrane Composition | Relative Humidity Exposure | Pre-exposure $O_2$ flux (GPU) | Post-exposure $O_2$ Flux (GPU) | Percentage Change in Flux After Exposure | Pre-exposure $O_2/N_2$ Selectivity | Post-exposure $O_2/N_2$ Selectivity | Percentage Change in Selectivity after Exposure |
|---|---|---|---|---|---|---|---|---|
| 6 | Carbon membrane (1) coated with 3.5 µm coating A | 83-85% for 24 hours | 29.9 | 26.6 | −11% | 7.8 | 7.7 | −1% |
| 7 | Carbon membrane (1) coated with | 83-85% for 24 | 32.3 | 19.1 | −41% | 8.4 | 9.6 | +14% |

TABLE 3-continued

Composite Membrane Performance at 83-85% Relative Humidity

| Exam. | Membrane Composition | Relative Humidity Exposure | Pre-exposure $O_2$ flux (GPU) | Post-exposure $O_2$ Flux (GPU) | Percentage Change in Flux After Exposure | Pre-exposure $O_2/N_2$ Selectivity | Post-exposure $O_2/N_2$ Selectivity | Percentage Change in Selectivity after Exposure |
|---|---|---|---|---|---|---|---|---|
| 8 | 4 μm coating B Carbon membrane (2) coated with 2.3 μm coating B | 83-85% for 24 hours | 27.8 | 15.6 | −44% | 11.8 | 12.7 | +8% |

TABLE 4

Uncoated Membrane Performance at 83-85% Relative Humidity

| Comp Exam. | Membrane Composition | Relative Humidity Exposure | Pre-exposure $O_2$ flux (GPU) | Post-exposure $O_2$ Flux (GPU) | Percentage Change in Flux After Exposure | Pre-exposure $O_2/N_2$ Selectivity | Post-exposure $O_2/N_2$ Selectivity | Percentage Change in Selectivity after Exposure |
|---|---|---|---|---|---|---|---|---|
| 9 | Carbon membrane (1) with no coating | 83-85% for 24 hours | 30.7 | 12.6 | −59% | 10.5 | 10.7 | +2% |
| 10 | Carbon membrane (2) with no coating | 83-85% for 24 hours | 31.1 | 15.6 | −50% | 13.4 | 12.8 | −5% |

TABLE 5

Coated and Uncoated Membrane Performance at 83-85% Relative Humidity for $H_2/CH_4$ Separations

| Exam. | Membrane Composition | Relative Humidity Exposure | Pre-exposure $O_2$ flux (GPU) | Post-exposure $O_2$ Flux (GPU) | Percentage Change in Flux After Exposure | Pre-exposure $H_2/CH_4$ Selectivity | Post-exposure $H_2/CH_4$ Selectivity | Percentage Change in Selectivity after Exposure |
|---|---|---|---|---|---|---|---|---|
| Exam. 11 | Carbon membrane (2) coated with 2.8 μm Teflon AF1600 | 83-85% for 24 hours | 113.8 | 97.9 | −14% | 206 | 196 | −5% |
| Comp Exam 12 | Carbon membrane (2) with no coating | 83-85% for 22 hours | 97.8 | 12.7 | −87% | 520 | 106 | −80% |

We claim:

1. A membrane for the separation of fluids comprising a carbon membrane coated with a coating that reduces the partial pressure of water or other condensible agents or impurities relative to the other permeable components and having resistance to the permeation of water or other impurities without causing significant losses to the selectivity or productivity of the membrane.

2. A membrane of claim 1 wherein the coating is selected from the group of poly(4-methyl-1-pentene), polyethylene and silicon-containing polymers.

3. A membrane of claim 2 wherein the coating is polysiloxane or poly(1-trimethyl silyl) propyne.

4. A membrane of claim 1, wherein the carbon membrane is in sheet form having a thickness from about 1 μm to about 300 μm.

5. A membrane of claim 1, wherein the carbon membrane is in the form of hollow fibers, having a diameter from about 50 μm to about 1000 μm diameter and with a wall thickness of about 10 μm to about 300 μm.

6. A membrane of claim 1, wherein the carbon membrane is of asymmetrical construction.

7. A membrane of claim 1, wherein the carbon membrane is the product of pyrolysis of a carbon-containing precursor at at temperature of about 250° C. to about 2500° C.

8. A membrane for the separation of fluids comprising a carbon membrane coated with a coating of a polymer having an aliphatic ring structure containing fluorine.

9. A membrane of claim 8 wherein the polymer comprises the group of repeating units represented by the following general formula:

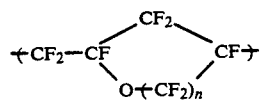

and/or

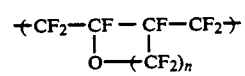

where n is an integer of 1 or 2, or copolymers thereof.

10. A membrane of claim 8 wherein the polymer is an amorphous polymer of perfluoro-2,2,-dimethyl-1,3-dioxole.

11. The membrane of claim 10 in which the polymer is a copolymer of perfluoro-2,2-dimethyl-1,3-dioxole.

12. The membrane of claim 11 in which the polymer is a copolymer of perfluoro-2,2-dimethyl-1,3-dioxole and a complementary amount of at least one monomer selected from the group consisting of tetrafluoroethylene, perfluoromethyl vinyl ether, vinylidene fluoride and chlorotrifluoroethylene.

13. The membrane of claim 10 in which the polymer is a homopolymer of perfluoro-2,2-dimethyl-1,3-dioxole.

14. The membrane of claim 10 in which the polymer is a dipolymer of perfluoro-2,2-dimethyl-1,3-dioxole and a complementary amount of tetrafluoroethylene.

15. The membrane of claim 14 in which the polymer is a dipolymer containing 65-99 mole % of perfluoro-2,2-dimethyl-1,3-dioxole and having a glass transition temperature of at least 140° C.

16. A membrane of claim 8, wherein the carbon membrane is in sheet form having a thickness from about 1 μm to about 300 μm.

17. A membrane of claim 8, wherein the carbon membrane is in the form of hollow fibers, having a diameter from about 50 μm to about 1000 μm diameter and with a wall thickness of about 10 μm to about 300 μm.

18. A membrane of claim 8, wherein the carbon membrane is of asymmetrical construction.

19. A membrane of claim 8, wherein the carbon membrane is the product of pyrolysis of a carbon-containing precursor at temperature of about 250° C. to about 2500° C.

20. A separation module of the shell and tube type comprising a plurality of hollow membranes as described in claim 5 or 17.

21. A process for separating fluids comprising contacting a mixture of fluids with the first side of the membrane described in any one of claims 1-19 in a manner to cause a portion of the mixture to pass through the membrane to a permeate side, the resulting mixture on the permeate side being enriched in one or more component over that of the mixture on the first side.

* * * * *